(No Model.) 2 Sheets—Sheet 1.

M. G. SMITH.
BRAKE LATCH.

No. 414,729. Patented Nov. 12, 1889.

WITNESSES:
Geo. D. Kedian
Robert E. Kedian

INVENTOR,
Miles G. Smith (No Model.) M. G. SMITH.
BRAKE LATCH.

No. 414,729. Patented Nov. 12, 1889.

Witnesses
Inventor
Miles G. Smith

UNITED STATES PATENT OFFICE.

MILES G. SMITH, OF KINGSTON, PENNSYLVANIA.

BRAKE-LATCH.

SPECIFICATION forming part of Letters Patent No. 414,729, dated November 12, 1889.

Application filed August 2, 1889. Serial No. 319,559. (No model.)

*To all whom it may concern:*

Be it known that I, MILES G. SMITH, a citizen of the United States, residing at Kingston, in the county of Luzerne and State of Pennsylvania, have invented a new and useful Mode of Constructing and Operating Latches or Pawls for Holding Car-Brakes when the Brakes have been Applied, of which the following is a specification.

My invention relates to a car-brake latch or pawl hinged, axled, or fastened upon the brake bar or shaft which passes through a tapered slot in the latch or pawl, which admits of a vibratory motion of the latch, whereby the latch is thrown on and off the teeth of the ratchet-wheel fixed upon the brake bar or shaft. I attain these objects by the mechanism constructed and operated as illustrated in the accompanying drawings, in which—

Figure 1:
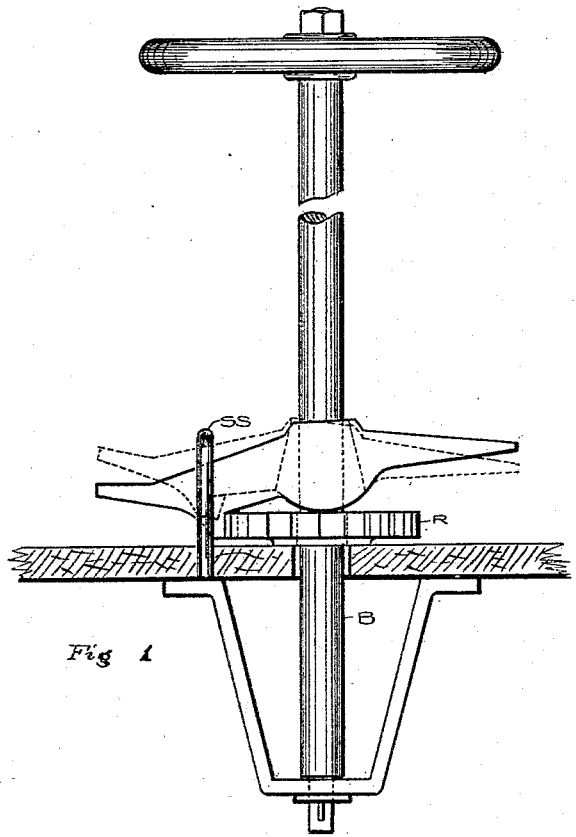
Figure 3:
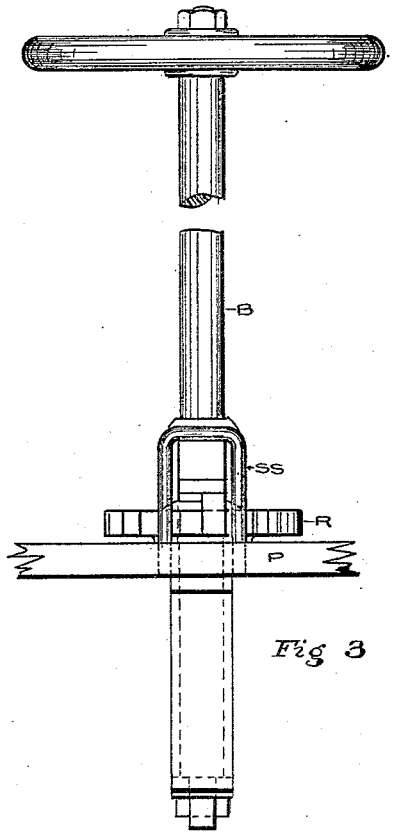
Figure 2:
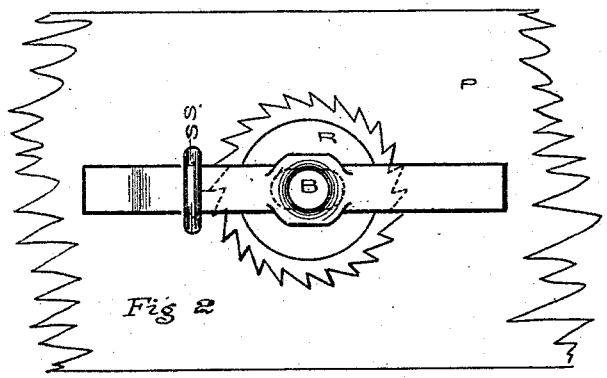
Figure 4:
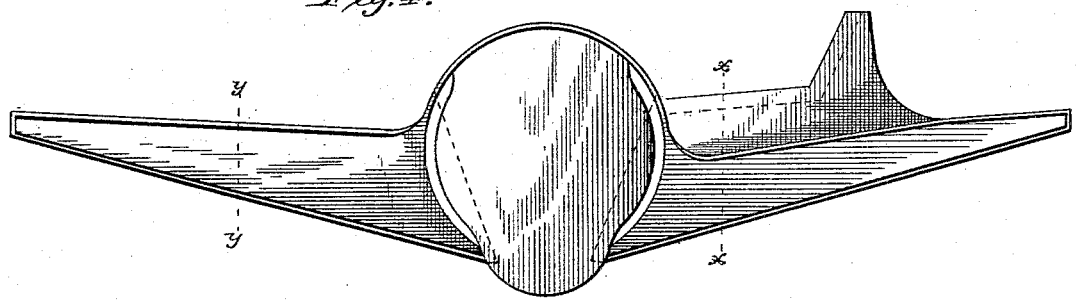
Figure 5:
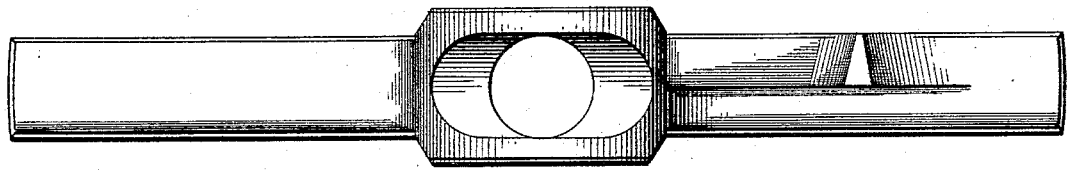
Figure 7:
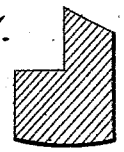
Figure 6:
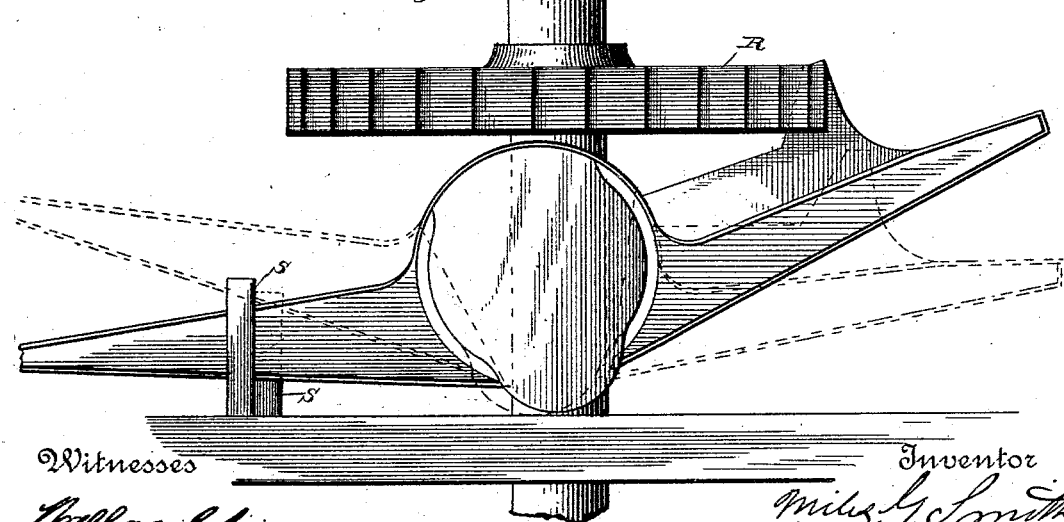

Figure 1 of the drawings represents a side view of the device as applied. Fig. 2 represents a top or plan view; and Fig. 3 represents a view of the end of the latch as the same appears guarded by the staple, stays, or guard S S. Fig. 4 is a side elevation of the latch, ratchet, or pawl. Fig. 5 is a plan view of the same. Fig. 6 is a side view showing the manner of applying the latch to the ratchet-wheel, (marked R,) and also showing a section of the brake-bar, (marked B.) Fig. 7 shows a sectional view of the plate or platform P, through which the brake-bar passes, and upon which are cast or fixed the two stops or guards (marked S S,) which hold the latch, ratchet, or pawl in position when in and out of operation.

Similar letters refer to similar parts in the several views.

The latch, ratchet, or pawl, being placed upon the brake bar or shaft B and held in place by the stays or guards S S, is operated by either its own weight or by pressure applied to the ratchet end of the latch or pawl when the ratchet-wheel is turned for the purpose of applying the brake to the car-wheel, the ratchet by its depression being caused to act upon the teeth of the ratchet-wheel, which it holds in place and prevents from turning backward. The latch, ratchet, or pawl is unlocked or unfastened and the ratchet-wheel and brake bar or shaft set free by depression of the end of the latch or pawl opposite the ratchet end of the latch, whereby the ratchet is lifted or unloosed from the teeth of the ratchet-wheel. The latch may be applied either above or below the ratchet-wheel, the latch or pawl being reversed on the brake bar or shaft. The latch or pawl may be applied to operate upon ratchet-wheels having the teeth or ratchets on the top or bottom sides of the wheel revolved on a vertical axis by slight change of position and form of the ratchet-tooth to conform therewith. When the latch, ratchet, or pawl is placed upon the brake bar or shaft B below the ratchet-wheel, as illustrated in drawings filed in this case, it is operated by either the weight of or pressure applied to the end of the latch or pawl opposite the ratchet end of the latch when the ratchet-wheel is turned for the purpose of applying the brake to the car-wheel, the pressure so applied causing the ratchet to act upon the teeth of the ratchet-wheel, which it holds in place and prevents from turning backward. When the latch, ratchet, or pawl is so placed upon the brake bar or shaft B below the ratchet-wheel and operating to hold the brake when applied, it is unlocked or unfastened, and the ratchet-wheel and brake bar or shaft and brake itself set free by depressing the ratchet end of the latch, whereby the tooth of the latch is lowered, separated, or unloosed from the teeth of the ratchet-wheel, as illustrated in drawings aforesaid.

What I claim as my invention, and desire to secure by Letters Patent, is—

1. A pawl or latch for ratchet-wheels, consisting of the two oppositely-extending arms having an intermediate pivotal orifice and provided with the ratchet-tooth, substantially as described.

2. The combination, with a shaft B, of a pawl or latch for ratchet-wheels, consisting of the two oppositely-extending arms having an intermediate pivotal orifice and provided with the ratchet-tooth, substantially as described.

MILES G. SMITH.

Witnesses:
HARRY S. ROHRER,
WM. H. DELACY.